(12) United States Patent
Verma et al.

(10) Patent No.: US 11,250,028 B2
(45) Date of Patent: Feb. 15, 2022

(54) DATA AGGREGATOR

(71) Applicant: BANK OF AMERICA CORPORATION, Charlotte, NC (US)

(72) Inventors: Sandeep Verma, Haryana (IN); Pinak Chakraborty, Telangana (IN); Sandeep Chauhan, Telangana (IN); Vidhu Beohar, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 1058 days.

(21) Appl. No.: 15/420,649

(22) Filed: Jan. 31, 2017

(65) Prior Publication Data

US 2018/0218062 A1  Aug. 2, 2018

(51) Int. Cl.
| | |
|---|---|
| *G06Q 10/00* | (2012.01) |
| *G06Q 30/00* | (2012.01) |
| *G06F 16/00* | (2019.01) |
| *G06F 16/28* | (2019.01) |
| *G06Q 30/02* | (2012.01) |
| *G06Q 50/00* | (2012.01) |
| *G06F 16/9535* | (2019.01) |

(52) U.S. Cl.
CPC ........ *G06F 16/285* (2019.01); *G06F 16/9535* (2019.01); *G06Q 30/0202* (2013.01); *G06Q 30/0206* (2013.01); *G06Q 50/01* (2013.01)

(58) Field of Classification Search
CPC .......................... G06Q 50/01; G06Q 30/0202
See application file for complete search history.

(56) References Cited

U.S. PATENT DOCUMENTS

| | | | |
|---|---|---|---|
| 7,107,400 B2 | 9/2006 | Benhase et al. | |
| 7,240,028 B1 * | 7/2007 | Rugge | G06Q 40/02 705/30 |
| 7,409,600 B2 | 8/2008 | Azevedo et al. | |
| 7,480,767 B2 | 1/2009 | Moser | |
| 7,840,848 B2 | 11/2010 | Azevedo et al. | |
| 7,966,329 B1 * | 6/2011 | Rukonic | G06Q 40/02 707/737 |
| 8,086,528 B2 * | 12/2011 | Barrett | G06Q 20/4037 705/38 |
| 8,234,194 B2 | 7/2012 | Mele et al. | |
| 8,260,645 B2 | 9/2012 | Banerjee et al. | |
| 8,620,780 B2 * | 12/2013 | Krakowiecki | G06Q 40/12 705/30 |

(Continued)

*Primary Examiner* — Hafiz A Kassim
*Assistant Examiner* — Matheus Ribeiro Stivaletti (57) ABSTRACT

A data aggregator includes a memory, a network interface, a vectorization engine, and an aggregator. The memory stores a plurality of aggregation rules. The network interface retrieves a plurality of transactions that includes a first transaction and a second transaction. The vectorization engine determines a first transaction vector for the first transaction and a second transaction vector for the second transaction. The aggregator determines that the first transaction occurred during a first life event and that the second transaction occurred during a second life event. The aggregator also determines that the first life event and the second life event are the same and in response to that determination, assigns the first transaction and the second transaction to a cluster for the first life event. The aggregator further stores the first life event, the second life event, and an identifier for the cluster to the database.

15 Claims, 3 Drawing Sheets

(56) References Cited

U.S. PATENT DOCUMENTS

| | | | | |
|---|---|---|---|---|
| 8,626,705 | B2* | 1/2014 | Barrett | G06Q 30/02 |
| | | | | 707/603 |
| 8,700,503 | B2 | 4/2014 | Krakowiecki et al. | |
| 8,706,758 | B2* | 4/2014 | Chew | G06F 16/273 |
| | | | | 707/776 |
| 8,862,512 | B2 | 10/2014 | Joa et al. | |
| 8,924,393 | B1* | 12/2014 | Channakeshava | G06F 16/35 |
| | | | | 707/738 |
| 8,930,265 | B2 | 1/2015 | Blackhurst et al. | |
| 9,911,155 | B1* | 3/2018 | Gupta | G06Q 40/00 |
| 9,959,560 | B1* | 5/2018 | Whitaker | G06Q 30/0625 |
| 9,965,797 | B1* | 5/2018 | Poole | G06Q 30/0633 |
| 10,475,125 | B1* | 11/2019 | Kumari | G06N 5/04 |
| 10,515,339 | B1* | 12/2019 | Hughes | G06Q 10/20 |
| 10,592,956 | B2* | 3/2020 | Hu | G06Q 30/0631 |
| 10,656,789 | B2* | 5/2020 | Joshi | H04L 51/08 |
| 2003/0084053 | A1* | 5/2003 | Govrin | G06Q 10/10 |
| 2004/0167808 | A1* | 8/2004 | Fredericks | G06Q 10/02 |
| | | | | 705/5 |
| 2005/0197950 | A1* | 9/2005 | Moya | G06Q 40/04 |
| | | | | 705/37 |
| 2007/0265946 | A1* | 11/2007 | Schimpf | G06Q 20/4016 |
| | | | | 705/35 |
| 2009/0019026 | A1* | 1/2009 | Valdes-Perez | G06F 16/285 |
| 2009/0132347 | A1* | 5/2009 | Anderson | G06Q 30/02 |
| | | | | 705/14.52 |
| 2009/0222364 | A1* | 9/2009 | McGlynn | G06Q 40/02 |
| | | | | 705/30 |
| 2009/0327045 | A1* | 12/2009 | Olives | G06Q 10/0639 |
| | | | | 705/16 |
| 2010/0057502 | A1* | 3/2010 | Arguelles | G06Q 50/265 |
| | | | | 705/5 |
| 2010/0153242 | A1* | 6/2010 | Preston | G06Q 40/00 |
| | | | | 705/30 |
| 2011/0258005 | A1* | 10/2011 | Fredericks | G06Q 50/14 |
| | | | | 705/5 |
| 2011/0289092 | A1* | 11/2011 | Kumar | G06F 11/3495 |
| | | | | 707/741 |
| 2012/0109802 | A1* | 5/2012 | Griffin | G06Q 40/00 |
| | | | | 705/35 |
| 2013/0061156 | A1* | 3/2013 | Olsen | G06Q 50/01 |
| | | | | 715/753 |
| 2013/0159081 | A1* | 6/2013 | Shastry | G06Q 30/0274 |
| | | | | 705/14.23 |
| 2014/0279311 | A1* | 9/2014 | Just | G06Q 40/12 |
| | | | | 705/30 |
| 2014/0324964 | A1* | 10/2014 | Anand | G06Q 30/0201 |
| | | | | 709/204 |
| 2015/0032574 | A1* | 1/2015 | Calman | G06Q 30/0629 |
| | | | | 705/26.64 |
| 2015/0073950 | A1* | 3/2015 | Canis | G06Q 40/12 |
| | | | | 705/30 |
| 2015/0088712 | A1* | 3/2015 | Votaw | G06Q 50/01 |
| | | | | 705/35 |
| 2015/0088716 | A1* | 3/2015 | Votaw | G06Q 50/01 |
| | | | | 705/35 |
| 2015/0242869 | A1* | 8/2015 | Unser | G06Q 30/0205 |
| | | | | 705/7.31 |
| 2016/0253688 | A1* | 9/2016 | Nielsen | G06F 16/337 |
| | | | | 705/7.31 |
| 2016/0275612 | A1* | 9/2016 | Wadley | G06Q 40/08 |
| 2017/0046727 | A1* | 2/2017 | Chau | G06Q 30/0631 |
| 2017/0116578 | A1* | 4/2017 | Hadatsuki | G06Q 10/1095 |
| 2017/0300184 | A1* | 10/2017 | Calles | G06Q 20/08 |
| 2017/0301048 | A1* | 10/2017 | Turek | G06Q 10/10 |
| 2017/0323246 | A1* | 11/2017 | Suzanne | G06Q 10/04 |
| 2017/0337480 | A1* | 11/2017 | Yin | G06N 5/048 |
| 2017/0346842 | A1* | 11/2017 | Giral | H04L 63/1433 |
| 2018/0046366 | A1* | 2/2018 | Li | G06F 3/04883 |
| 2018/0046939 | A1* | 2/2018 | Meron | G06Q 20/405 |
| 2018/0084078 | A1* | 3/2018 | Yan | H04L 67/02 |
| 2018/0089303 | A1* | 3/2018 | Miller | G06F 16/26 |
| 2018/0164959 | A1* | 6/2018 | Gupta | G06Q 10/109 |
| 2018/0174130 | A1* | 6/2018 | Shroff | G06Q 30/0267 |
| 2020/0026695 | A1* | 1/2020 | Yan | G06F 16/285 |

* cited by examiner

DATA AGGREGATOR

TECHNICAL FIELD

This disclosure relates generally to data aggregation.

BACKGROUND

An organization may use databases to store data about itself and its clients. Even one client may correspond to volumes of data. When a client requests its data, the organization may retrieve and send all that data to the client.

SUMMARY OF THE DISCLOSURE

According to an embodiment, a data aggregator includes a memory, a network interface, a vectorization engine, and an aggregator. The memory stores a plurality of aggregation rules. Each aggregation rule indicates a life event and a transaction vector. The network interface retrieves a plurality of transactions from a database. The plurality of transactions include a first transaction and a second transaction. The vectorization engine determines a first transaction vector for the first transaction and determines a second transaction vector for the second transaction. The aggregator determines, based on the first transaction vector and an aggregation rule of the plurality of aggregation rules, that the first transaction occurred during a first life event and determines, based on the second transaction vector and an aggregation rule of the plurality of aggregation rules, that the second transaction occurred during a second life event. The aggregator also determines that the first life event and the second life event are the same and in response to the determination that the first life event and the second life event are the same, assigns the first transaction and the second transaction to a cluster for the first life event. The aggregator further stores the first life event, the second life event, and an identifier for the cluster to the database.

According to another embodiment, a method includes storing a plurality of aggregation rules. Each aggregation rule indicates a life event and a transaction vector. The method also includes retrieving a plurality of transactions from a database. The plurality of transactions include a first transaction and a second transaction. The method further includes determining a first transaction vector for the first transaction, determining a second transaction vector for the second transaction, and determining, based on the first transaction vector and an aggregation rule of the plurality of aggregation rules, that the first transaction occurred during a first life event. The method also includes determining, based on the second transaction vector and an aggregation rule of the plurality of aggregation rules, that the second transaction occurred during a second life event and determining that the first life event and the second life event are the same. The method further includes in response to the determination that the first life event and the second life event are the same, assigning the first transaction and the second transaction to a cluster for the first life event and storing the first life event, the second life event, and an identifier for the cluster to the database.

According to yet another embodiment, a system includes a database and a data aggregator. The database stores a plurality of transactions. The data aggregator stores a plurality of aggregation rules. Each aggregation rule indicates a life event and a transaction vector. The data aggregator also retrieves the plurality of transactions from the database. The plurality of transactions include a first transaction and a second transaction. The data aggregator further determines a first transaction vector for the first transaction, determines a second transaction vector for the second transaction, and determines, based on the first transaction vector and an aggregation rule of the plurality of aggregation rules, that the first transaction occurred during a first life event. The data aggregator also determines, based on the second transaction vector and an aggregation rule of the plurality of aggregation rules, that the second transaction occurred during a second life event and determines that the first life event and the second life event are the same. The data aggregator further in response to the determination that the first life event and the second life event are the same, assigns the first transaction and the second transaction to a cluster for the first life event and stores the first life event, the second life event, and an identifier for the cluster to the database.

Certain embodiments provide one or more technical advantages. For example, an embodiment reduces the amount of data retrieved and/or communicated to respond to a request, which improves the network bandwidth consumed. As another example, an embodiment reduces network, processor, and memory usage by limiting the amount of data retrieved from a database. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
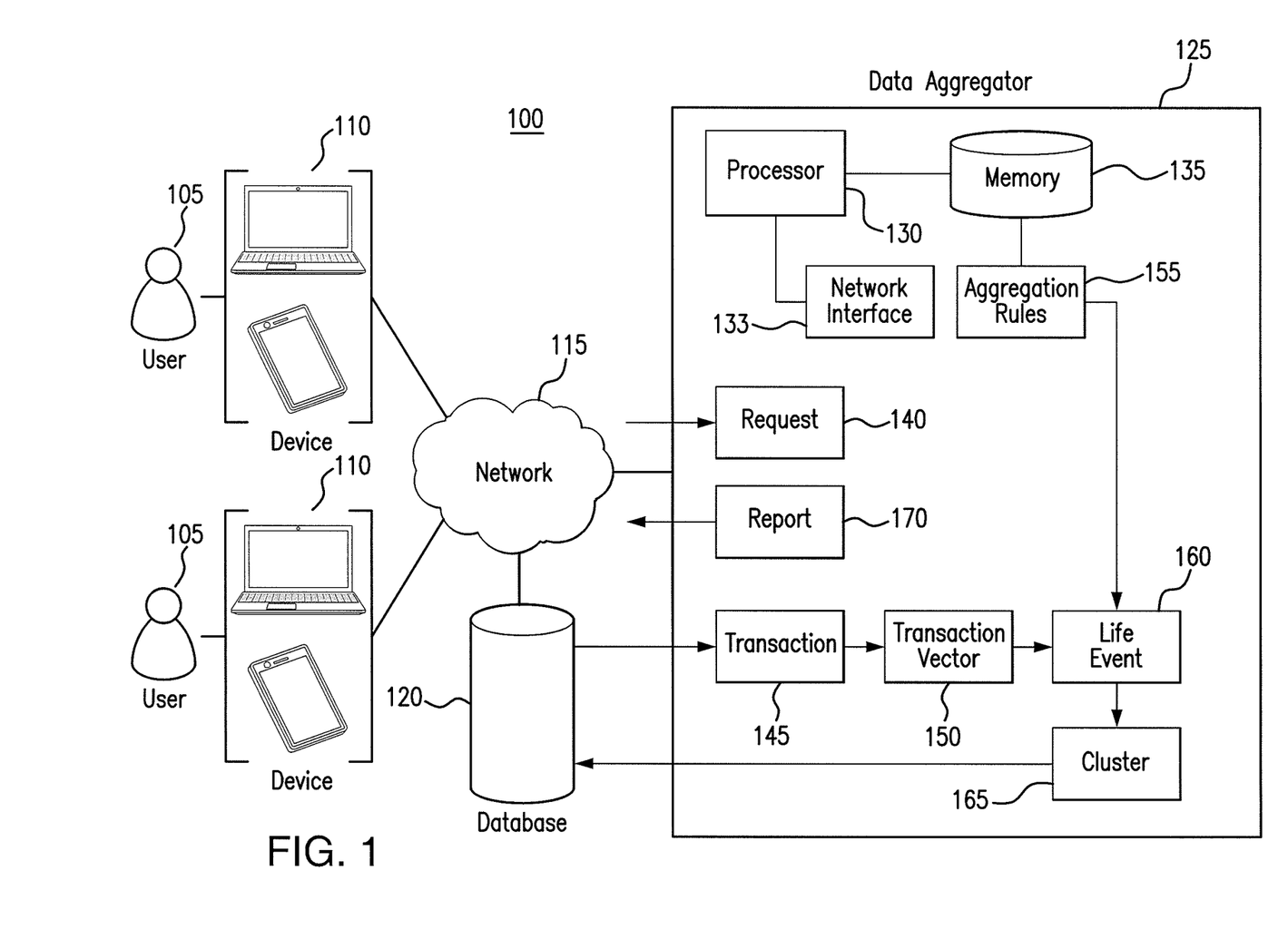
FIG. 1 illustrates a system for data aggregation.
Figure 2:
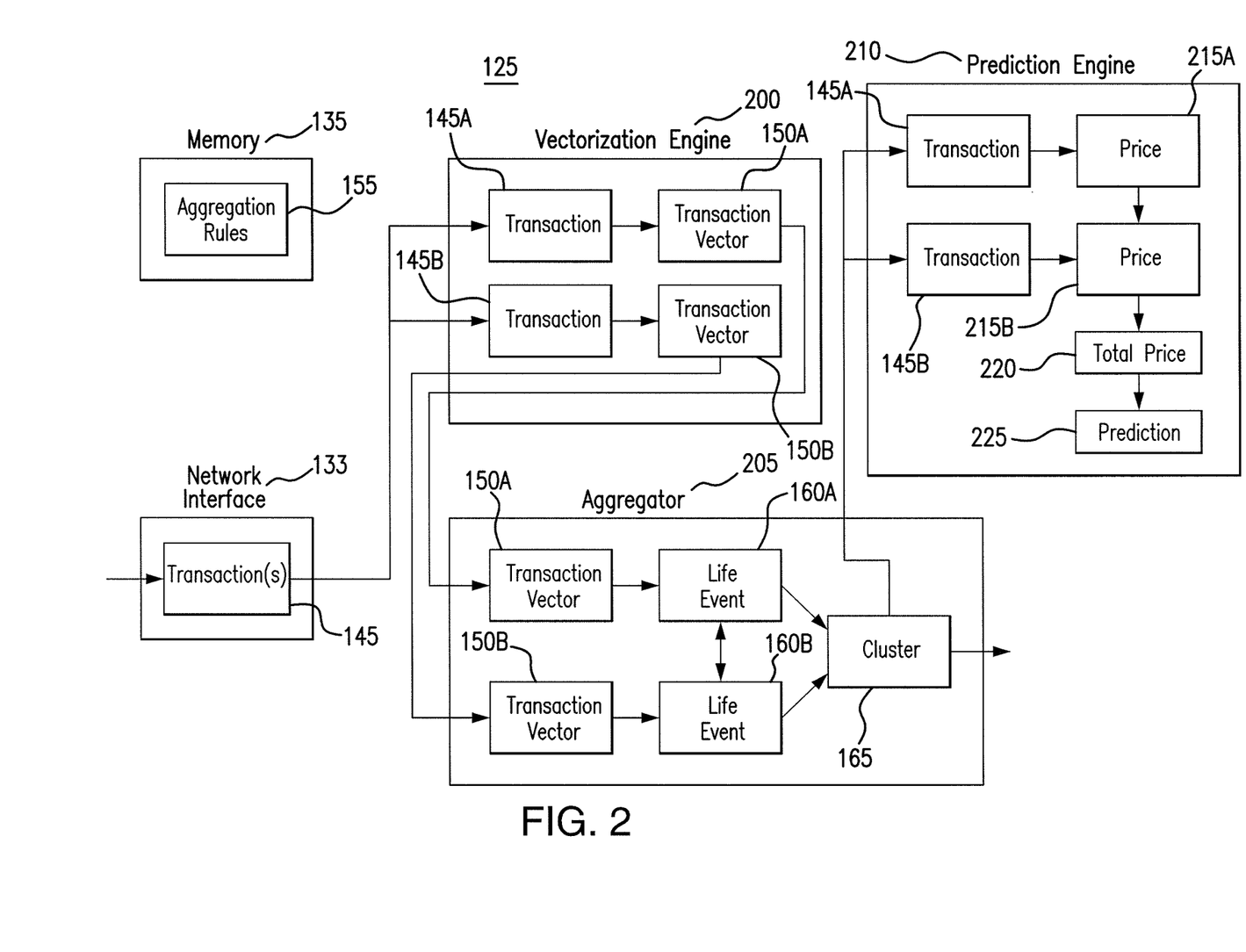
FIG. 2 illustrates the data aggregator of the system of FIG. 1.
Figure 3:
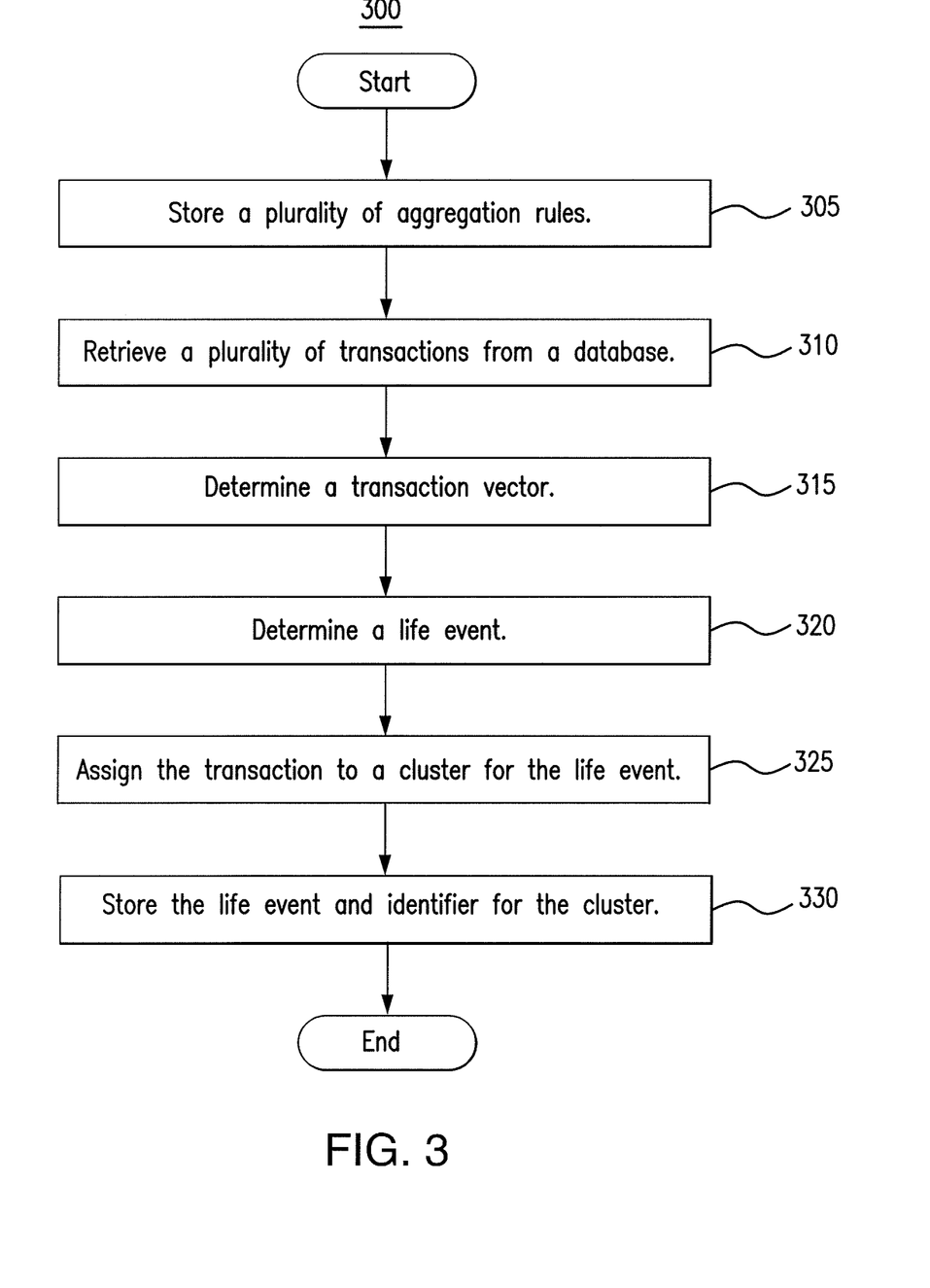
FIG. 3 is a flowchart illustrating a method for aggregating data using the system of FIG. 1.

Embodiments of the present disclosure and its advantages are best understood by referring to FIGS. 1 through 3 of the drawings, like numerals being used for like and corresponding parts of the various drawings.

An organization may use databases to store data about itself and its clients. Even one client may correspond to volumes of data. When a client requests its data, the organization may retrieve and send all that data to the client. For example, a retailer may store transaction data for each of its customers. The customers may then retrieve a history of their transactions using a computer or mobile device. In this manner, the customers may view and review their transactions with the retailer.

In many situations an organization may have clients that generate a voluminous amount of data. For example, a retailer may have a customer who generates many transactions per day with the retailer. As a result, when the client requests its data from the organization, the organization may need to retrieve and then communicate a voluminous amount of data to the client. This process may be slow and resource intensive for both the organization and the client. Using the previous example, the customer who generates many transactions per day may request its data from the retailer. In response, the retailer may retrieve a voluminous amount of transaction data and communicate all that data to the customer. The customer may notice a slowdown on his computer and/or mobile device. Likewise, the retailer may notice a slowdown and heavy resource consumption on its servers and networks.

This disclosure contemplates a data aggregator that addresses the issues faced by organizations with clients that generate lots of data. Generally, the data aggregator categorizes transactions around particular life events. When a client requests its data, the system may further receive information about a requested life event. The system may then retrieve data particular to that life event rather than retrieving and communicating all of the client's data. As a result, less data is retrieved and communicated to the client which improves operating speeds on both the organization's and client's ends. Additionally, the data aggregator may reduce resource consumption such as, for example, processor resources, memory resources, and/or network bandwidth. The data aggregator will be described generally using FIG. 1. The data aggregator will be described more specifically using FIGS. 2 and 3.

FIG. 1 illustrates a system 100 for data aggregation. As illustrated in FIG. 1, system 100 includes devices 110, a network 115, a database 120, and a data aggregator 125. In certain embodiments, system 100 reduces data retrieved and/or communicated over network 115 in response to requests from users 105. As a result, processor, memory, and network resources are conserved and operation speeds are increased.

Users 105 may use one or more devices 110 to request data. Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 may store data for users 105. For example, database 120 may store transactions performed by users 105. As another example, database 120 may store authentication and identification information for users 105. Information stored in database 120 may be used by data aggregator 125.

In some embodiments, data aggregator 125 may store information into database 120. This disclosure contemplates database 120 storing any appropriate type of information.

For example, when a user 105 performs a transaction such as, for example, purchasing a plane ticket, that transaction may be logged into database 120. When user 105 requests to retrieve data from database 120, information about the plane ticket, such as the purchase price, the time of the purchase, the airlines, the destination, and/or the price may be retrieved from database 120 for user 105.

In some instances a user 105 may perform many transactions that are logged in database 120. As a result, when user 105 requests data from database 120, a voluminous amount of data must be retrieved from database 120 and communicated over network 115 to device 110. Device 110 may then process the data and present it to user 105. Because the amount of data may be large, the user's 105 request may strain database 120, network 115 and device 110. For example, database 120 may use more processor and memory resources to retrieve the data and database 120 may consume more bandwidth over network 115 to communicate that data to device 110. Additionally, device 110 may use more processor and memory resources to process the large amount of data and present it to user 105. As a result, database 120, network 115 and device 110 may process the user's 105 request slowly.

Data aggregator 125 may address the issues faced by system 100 when a user 105 requests a voluminous amount of data. Data aggregator 125 may aggregate information in database 120 based on certain life events. Then, requests for that data may be made based on a particular life event. In this manner, the amount of data retrieved and communicated may be limited. As illustrated in FIG. 1, data aggregator 125 includes a processor 130, a network interface 133, and a memory 135. This disclosure contemplates processor 130, network interface 133, and memory 135 being communicatively coupled together and configured to perform any of the functions of data aggregator 125 disclosed herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of data aggregator 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of data aggregator 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Network interface 133 represents any suitable device operable to receive information from network 115, transmit information through network 115, perform processing of information, communicate with other devices, or any combination of the preceding. For example, network interface 133 may receive user interactions from device 110. As another example, network interface 133 may communicate messages to device 110. Network interface 133 represents any port or connection, real or virtual, including any suitable hardware and/or software, including protocol conversion and data processing capabilities, to communicate through a LAN, WAN, or other communication system that allows processor 130 to exchange information with device 110, network 115, or other components of system 100.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Data aggregator 125 may receive a request 140. Request 140 may include any appropriate information. For example, request 140 may be a request for data of user 105. Request 140 may indicate a particular life event. As another example, request 140 may indicate a transaction that was conducted. This disclosure contemplates request 140 encompassing any communication from user 105 using device 110. In some embodiments, request 140 may indicate a particular life event for a particular piece of information such as, for example, a transaction.

In response to receiving request 140, data aggregator 125 may retrieve data from database 120. In the illustrated example of FIG. 1, data aggregator 125 retrieves a transaction 145 from database 120. The transaction may be, for example, a purchase made by a user 105. Data aggregator 125 may process transaction 145 to generate a transaction vector 150. Transaction vector 150 may include information pertinent to determining and/or classifying transaction 145. For example, transaction vector 150 may indicate a date of transaction 145, a price for transaction 145, and/or a vendor that supported transaction 145. Using the previous example, if transaction 145 indicates the purchase of a plane ticket, transaction vector 150 may indicate a date of the purchase, the price of the ticket, and the airlines from which the ticket was purchased. The information in transaction vector 150 may be used to aggregate transaction 145 to a particular life event.

Data aggregator 125 may generate and/or store aggregation rules 155. Aggregation rules 155 may indicate how certain transactions 145 should be aggregated based on transaction vector 150. For example, an aggregation rule 155 may indicate that airline ticket purchases should be aggregated and/or categorized as a travel purchase. Based on that aggregation rule 155, data aggregator 125 may aggregate an airline ticket purchase with a travel life event.

This disclosure contemplates data aggregator 125 being supplied with aggregation rules 155 by an administrator. Furthermore, this disclosure contemplates data aggregator 125 learning aggregation rules 155 based on input from user 105. For example, a user 105 may classify and/or aggregate an airline ticket purchase with a wedding life event. Based on that input, data aggregator 125 may form an aggregation rule 155 that airline ticket purchases in a certain date range should be organized under a wedding life event.

Life event 160 may be used by data aggregator 125 to group and/or cluster transactions 145. Data aggregator 125 may group transactions 145 with a life event 160 based on aggregation rules 155 and/or transaction vectors 150. Example life events 160 include travel, weddings, moves, purchases of real estate, and/or the addition of family members. In some embodiments, data aggregator 125 may determine a life event 160 based on any appropriate input from user 105. For example, data aggregator 125 may determine a particular life event 160 based on a social media feed of user 105. As an example, if user 105 made a post about an upcoming wedding, data aggregator 125 may process that post and determine a wedding life event 160 for user 105.

In some embodiments, user 105 may correct data aggregator 125 about an assigned life event 160. For example, data aggregator 125 may assign a transaction 145 to a particular life event 160 such as, for example, a wedding. User 105 may notice that that assignment is incorrect and assign the transaction 145 to a travel life event 160. As a result, data aggregator 125 may assign transaction 145 to the travel life event 160. Furthermore, data aggregator 125 may generate a new aggregation rule 155 corresponding to the user's correction.

Data aggregator 125 may generate a cluster 165. Each cluster 165 may include one or more transactions 145 associated with a life event 160. Using the previous example, if a life event 160 is a wedding, then cluster 165 for that life event 160 may include transactions such as purchase of airline ticket, purchases of wedding dress, and/or paying a caterer. Data aggregator 125 may then store cluster 165 (or an identifier for cluster 165) in database 120. When a user 105 subsequently requests data from database 120, the user 105 may request transactions 145 associated with a particular life event 160. Data aggregator 125 may then retrieve cluster 165 for that life event 160 and retrieve only the transactions 145 assigned to that cluster 165. As a result, fewer transactions 145 are retrieved and communicated over network 115. Furthermore, device 110 processes fewer transactions 145. As a result, processor memory and network resource consumption is reduced. Additionally, operation speeds of device 110 and database 120 are increased.

This disclosure contemplates data aggregator 125 processing more than one transaction 145. In some embodiments, data aggregator 125 may group and/or assign multiple transactions 145 to the same cluster 165 if those transactions 145 are determined to be part of the same life event 160.

This disclosure contemplates data aggregator 125 generating any number of clusters 165. For example, data aggregator 125 may generate a cluster 165 for each unique life event 160. As an example, there may be a cluster 165 for a travel life event, a different cluster 165 for a wedding life event and another different cluster 165 for a new family member life event.

Data aggregator 125 may generate a report 170 indicating the requested transactions 145. Data aggregator 125 may then communicate report 170 to device 110 over network 115. Device 110 may process report 170 and present report 170 to user 105 so that user 105 may view the requested information from database 120.

FIG. 2 illustrates the data aggregator 125 of the system 100 of FIG. 1. As illustrated in FIG. 2, data aggregator 125 includes a network interface 133, a memory 135, a vectorization engine 200, an aggregator 205, and a prediction engine 210. For purposes of clarity, certain components of data aggregator 125 have been omitted. In certain embodiments, one or more of the components of data aggregator 125 may be implemented using processor 130. By using data aggregator 125, operational speeds may be increased and resource consumption may be reduced in certain embodiments. For example, data aggregator 125 may reduce the amount of data retrieved from a database and/or communicated over a network.

Network interface 133 may retrieve information from a database. In the illustrated example of FIG. 2, network interface 133 retrieves one or more transactions 145 from a database. Network interface 133 may have retrieved transactions 145 in response to a request from a user for information. In some embodiments, network interface 133 may retrieve transactions 145 in order to aggregate transactions 145. This disclosure contemplates network interface 133 retrieving any appropriate information from a database. For example, transactions 145 may include purchases and/or sales made by a user.

Memory 135 stores aggregation rules 155. Data aggregator 125 may use aggregation rules 155 to aggregate transactions 145. For example, data aggregator 125 may use aggregation rules 155 to assign transactions 145 to particular life events 160.

Vectorization engine 200 receives one or more transactions 145 from network interface 133. In the illustrated example of FIG. 2, vectorization engine 200 receives a first transaction 145a and a second transaction 145b. This disclosure contemplates vectorization engine 200 receiving any number of transactions 145 from network interface 133. Vectorization engine 200 processes transactions 145 to generate a transaction vector 150 for each transaction 145.

Each transaction vector 150 indicates certain information about a transaction 145. For example, transaction vector 150 may indicate a time and/or date of transaction 145. As another example, transaction vector 150 may indicate a vendor corresponding to transaction 145. As yet another example, transaction vector 150 may indicate a transaction type of transaction 145 such as, for example, the product and/or service that was purchased or sold. In the illustrated example of FIG. 2, vectorization engine 200 processes first transaction 145a to generate a first transaction vector 150a and second transaction 145b to generate a second transaction vector 150b. Other components of data aggregator 125 may analyze transaction vectors 150 to categorize and/or assign transactions 145 to particular life events 160. For example, first transaction 145a may be the purchase of a plane ticket and second transaction 145b may be the purchase of catering services. First transaction vector 150a may then indicate the purchase of a plane ticket on a certain date from a particular airline while second transaction vector 150b may indicate the purchase of a catering service on a particular date from a particular catering vendor.

Aggregator 205 may use transaction vectors 150 to assign transactions 145 to particular life events 160 and/or clusters 165. In the illustrated example of FIG. 2, first transaction vector 150a and second transaction vector 150b are processed to determine a first life event 160a and a second life event 160b that correspond to first transaction vector 150a and second transaction vector 150b, respectively. Aggregator 205 may use aggregation rules 155 to determine the particular life events 160 for transactions 145. For example, an aggregation rule 155 may indicate that transactions occurring within a particular date range are for a trip that occurred during that date range. As a result, aggregator 205 may process first transaction vector 150a and second transaction vector 150b to determine whether their corresponding first transaction 145a and second transaction 145b occurred within that date range. If so, aggregator 205 may assign those transactions 145 to a travel life event 160. As another example, aggregation rule 155 may indicate that catering services are purchased during a wedding life event. As a result, aggregator 205 may assign second transaction 145b, which in the previous example was for the purchase of catering services, to a wedding life event 160.

After transactions 145 are assigned to certain life events 160, aggregator 205 may compare life events 160 in order to assign certain transactions 145 to a particular cluster 165. For example, if aggregator 205 determines that first life event 160a and second life event 160b are the same, then aggregator 205 may assign first transaction 145a and second transaction 145b to the same cluster 165. Using the previous example, if aggregation rules 155 indicate that transactions 145 that occurred within a particular date range were for a trip and aggregator 205 determines that first transaction 145a and second transaction 145b occurred within that date range, then aggregator 205 may assign first transaction 145a and second transaction 145b to travel life events 160. Aggregator 205 may then determine that first life event 160a and second life event 160b are both travel life events. As a result, aggregator 205 may assign first transaction 145a and second transaction 145b to cluster 165. If aggregator 205 determines that first life event 160a and second life event 160b are different, then aggregator 205 may assign first transaction 145a and second transaction 145b to different clusters 165.

Aggregator 205 may store cluster 165 into a database. In some embodiments, 205 may store an identifier for cluster 165 into the database. Once stored, the transactions assigned to the cluster 154 will be grouped according to that cluster 165. These transactions 145 may then be retrieved and/or presented based on the cluster 165 that they are assigned to. As a result, users 105 may request and/or retrieve transactions 145 according to the clusters 165 that they are assigned to thereby reducing the amount of data retrieved and/or presented to the user 105. This increases the processing speeds of system 100 and also reduces the processor resource, memory resource and network bandwidth consumption of system 100.

In particular embodiments, data aggregator 125 may use clusters 165 to predict prices of subsequent life events 160. Data aggregator 125 may include prediction engine 210 that predicts prices of subsequent life events. In the illustrated example of FIG. 2, prediction engine 210 receives cluster 165 and determines first transaction 145a and second transaction 145b that are assigned to cluster 165. Based on first transaction 145a and second transaction 145b, prediction engine 210 may determine a first price 215a and a second price 215b associated respectively with these transactions 145. In some embodiments, prediction engine 210 may determine first price 215a and second price 215b based on the transaction vectors 150 associated with the transactions 145. The transaction vectors 150 may indicate the prices for the transactions 145. Prediction engine 210 may then sum the prices 215 to determine a total price 220 for the life event 160 associated with cluster 165. Based on total price 220, prediction engine 210 may then form a prediction 225 that may include a predicted price for subsequent life events 160. For example, if a user 105 conducted transactions 145a and 145b during a trip to New York City, prediction engine 210 may determine a total price 220 of $500. When a subsequent user is planning a trip to New York City, prediction engine 210 may generate a prediction 225 based on total price 220. For example, prediction engine 210 may predict that a trip to New York City will cost approximately $500 to $600. The subsequent user 105 may then budget around the prediction 225.

In particular embodiments, a user 105 may leverage the clustered transactions 145. For example, a user 105 may request transactions 145 related to a particular life event 160. In response, data aggregator 125 may retrieve from a database all the transactions that are assigned to a cluster 165 for the life event 160. Data aggregator 125 may then generate a report 170 that includes the transactions 145 assigned to cluster 165 and communicate report 170 to the user 105. As a result, the user 105 did not need to retrieve every transaction 145 from the database. Data aggregator 125 was able to fulfill the user's request without retrieving every transaction 145 performed by the user 105. This improves the operation speeds of a device 110 used by user 105. Furthermore, this process reduces the amount of processing resources, memory resources and network bandwidth consumed to fulfill the user's request.

In some embodiments, a user 105 may request transactions 145 for multiple life events 160. In response, data aggregator 125 may retrieve transactions 145 from multiple clusters 165. Each cluster 165 is for a different life event 160. Data aggregator 125 may communicate each transaction 145 associated with each of the retrieved clusters 165. Furthermore, data aggregator 125 may communicate a total price 220 for each cluster 165. Report 170 may include total price 220 for each cluster 165. In this manner, the user 105 may analyze the total amount spent for each life event 160.

FIG. 3 is a flowchart illustrating a method 300 for aggregating data using the system 100 of FIG. 1. In particular embodiments, data aggregator 125 performs method 300. By performing method 300, data aggregator 125 may improve the operation speed of system 100. Additionally, data aggregator 125 may reduce processor resource consumption, memory resource consumption and/or network bandwidth consumption.

Data aggregator 125 may begin by storing a plurality of aggregation rules 305. In step 310 data aggregator 125 may retrieve a plurality of transactions from a database. Data aggregator 125 may then determine a transaction vector in step 315. In step 320 data aggregator 125 may determine a life event. In particular embodiments, data aggregator 125 may determine the life event based on the transaction vector and the stored aggregation rules. In step 325 data aggregator 125 may assign the transaction to a cluster for the life event. In step 330 data aggregator 125 may store the life event in identifier for the cluster back to a database.

Modifications, additions, or omissions may be made to methods 300 and 500 depicted in FIGS. 3 and 5. Methods 300 and 500 may include more, fewer, or other steps. For example, steps may be performed in parallel or in any suitable order. While discussed as automated response tool 120 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A data aggregator comprising:
a memory configured to store a plurality of aggregation rules, wherein each aggregation rule indicates a life event and a transaction vector;
a network interface configured to retrieve a plurality of transactions from a database, the plurality of transactions comprising a first transaction and a second transaction; and
a hardware processor configured to:
determine a first transaction vector for the first transaction, the first transaction vector indicating a first time of the first transaction, a first product or first service transferred in the first transaction, and a first vendor that conducted the first transaction;
determine a second transaction vector for the second transaction, the second transaction vector indicating a second time of the second transaction, a second product or second service transferred in the second transaction, and a second vendor that conducted the second transaction;
determine, based on the first transaction vector, the first time of the first transaction, the first product or first service transferred in the first transaction, the first vendor, and an aggregation rule of the plurality of aggregation rules, that the first transaction occurred during a first life event corresponding to travel during a date range;
determine, based on the second transaction vector, the second time of the second transaction, the second product or second service transferred in the second transaction, the second vendor, and an aggregation rule of the plurality of aggregation rules, that the second transaction occurred during a second life event corresponding to travel during the date range, wherein the date range includes the first time of the first transaction and the second time of the second transaction;
determine, based at least in part upon the first life event and the second life event corresponding to travel during the date range, that the first life event and the second life event are the same travel life event;
in response to the determination that the first life event and the second life event are the same travel life event, assign the first transaction and the second transaction to a first cluster for the travel life event;
store the first life event, the second life event, and an identifier for the first cluster to the database;
receive, from a user, a correction indicating a third life event for the first transaction, wherein the third life event does not correspond to travel during the date range;
in response to receiving the correction, assign the first transaction to a second cluster for the third life event;
after assigning the first transaction to the second cluster for the third life event, receive a request from the user for transactions related to the travel life event;
in response to the request, reduce an amount of network bandwidth consumed to retrieve data from the database by clustering the plurality of transactions according to identifiers for the clusters in the database and retrieving from the database the second transaction assigned to the first cluster but not the first transaction assigned to the second cluster, thereby reducing the amount of data retrieved from the database;
determine transactions assigned to the first cluster;

determine, for each of the transactions assigned to the first cluster, a corresponding transaction price;

determine, based on the transaction price determined for each of the transactions assigned to the first cluster, a total price for transactions assigned to the first cluster;

determine, based on the total price, a predicted price range for a subsequent travel life event, wherein the predicted price range encompasses the total price; and communicate, to a user device, a report comprising the retrieved second transaction correlated with the travel life event and the predicted price for the subsequent travel life event according to the identifier of the particular cluster stored in the database, thereby reducing an amount of data retrieved and presented to the user device and consequently increasing processor speeds of the data aggregator and the user device and decreasing consumption of processor resources, memory resources, and network bandwidth by the data aggregator and the user device.

2. The data aggregator of claim 1, wherein the database stores authentication information for the user.

3. The data aggregator of claim 1, wherein the hardware processor is further configured to:
determine a first transaction type for the first transaction; and
determine a second transaction type for the second transaction.

4. The data aggregator of claim 1, wherein the hardware processor is further configured to determine the third life event based on a social media feed.

5. The data aggregator of claim 1, wherein the network interface is further configured to:
retrieve a total price for each cluster of a plurality of clusters, each cluster of the plurality of clusters for a different life event; and
communicate each life event for the plurality of clusters and the total price for each cluster of each life event.

6. A method comprising:
storing a plurality of aggregation rules, wherein each aggregation rule indicates a life event and a transaction vector;
retrieving a plurality of transactions from a database, the plurality of transactions comprising a first transaction and a second transaction;
determining a first transaction vector for the first transaction, the first transaction vector indicating a first time of the first transaction, a first product or first service transferred in the first transaction, and a first vendor that conducted the first transaction;
determining a second transaction vector for the second transaction, the second transaction vector indicating a second time of the second transaction, a second product or second service transferred in the second transaction, and a second vendor that conducted the second transaction;
determining, based on the first transaction vector, the first time of the first transaction, the first product or first service transferred in the first transaction, the first vendor, and an aggregation rule of the plurality of aggregation rules, that the first transaction occurred during a first life event corresponding to travel during a date range;
determining, based on the second transaction vector, the second time of the second transaction, the second product or second service transferred in the second transaction, the second vendor, and an aggregation rule of the plurality of aggregation rules, that the second transaction occurred during a second life event corresponding to travel during the date range, wherein the date range includes the first time of the first transaction and the second time of the second transaction;

determining, based at least in part upon the first life event and the second life event corresponding to travel during the date range, that the first life event and the second life event are the same travel life event;

in response to the determination that the first life event and the second life event are the same travel life event, assigning the first transaction and the second transaction to a first cluster for the travel life event;

storing the first life event, the second life event, and an identifier for the first cluster to the database;

receiving, from a user, a correction indicating a third life event for the first transaction, wherein the third life event does not correspond to travel during the date range;

in response to receiving the correction, assigning the first transaction to a second cluster for the third life event;

after assigning the first transaction to the second cluster for the third life event, receiving a request from the user for transactions related to the travel life event;

in response to the request, reducing an amount of network bandwidth consumed to retrieve data from the database by clustering the plurality of transactions according to identifiers for the clusters in the database and retrieving from the database the second transaction assigned to the first cluster but not the first transaction assigned to the second cluster, thereby reducing the amount of data retrieved from the database;

determining transactions assigned to the first cluster;

determining, for each of the transactions assigned to the first cluster, a corresponding transaction price;

determining, based on the transaction price determined for each of the transactions assigned to the first cluster, a total price for transactions assigned to the first cluster, such that an amount of processing resources, memory resources, and network bandwidth is reduced to respond to the request;

determining, based on the total price, a predicted price range for a subsequent travel life event, wherein the predicted price range encompasses the total price; and communicating, to a user device, a report comprising the retrieved second transaction correlated with the travel life event and the predicted price for the subsequent travel life event according to the identifier of the particular cluster stored in the database, thereby reducing an amount of data retrieved and presented to the user device and consequently increasing processor speeds of the data aggregator and the user device and decreasing consumption of processor resources, memory resources, and network bandwidth by the data aggregator and the user devices.

7. The method of claim 6, wherein the database stores authentication information for the user.

8. The method of claim 6, further comprising:
determining a first transaction type for the first transaction; and
determining a second transaction type for the second transaction.

9. The method of claim 6, further comprising determining the third life event based on a social media feed.

10. The method of claim 6, further comprising:

retrieving a total price for each cluster of a plurality of clusters, each cluster of the plurality of clusters for a different life event; and communicating each life event for the plurality of clusters and the total price for each cluster of each life event.

11. A system comprising:

a database configured to store a plurality of transactions; and a data aggregator comprising a hardware processor communicatively coupled to a memory, the hardware processor configured to:

store a plurality of aggregation rules, wherein each aggregation rule indicates a life event and a transaction vector;

retrieve the plurality of transactions from the database, the plurality of transactions comprising a first transaction and a second transaction;

determine a first transaction vector for the first transaction, the first transaction vector indicating a first time of the first transaction, a first product or first service transferred in the first transaction, and a first vendor that conducted the first transaction;

determine a second transaction vector for the second transaction, the second transaction vector indicating a second time of the second transaction, a second product or second service transferred in the second transaction, and a second vendor that conducted the second transaction;

determine, based on the first transaction vector, the first time of the first transaction, the first product or first service transferred in the first transaction, the first vendor, and an aggregation rule of the plurality of aggregation rules, that the first transaction occurred during a first life event corresponding to travel during a date range;

determine, based on the second transaction vector, the second time of the second transaction, the second product or second service transferred in the second transaction, the second vendor, and an aggregation rule of the plurality of aggregation rules, that the second transaction occurred during a second life event corresponding to travel during the date range, wherein the date range includes the first time of the first transaction and the second time of the second transaction;

determine, based at least in part upon the first life event and the second life event corresponding to travel during the date range, that the first life event and the second life event are the same travel life event;

in response to the determination that the first life event and the second life event are the same travel life event, assign the first transaction and the second transaction to a first cluster for the travel life event;

store the first life event, the second life event, and an identifier for the first cluster to the database;

receive, from a user, a correction indicating a third life event for the first transaction, wherein the third life event does not correspond to travel during the date range;

in response to receiving the correction, assign the first transaction to a second cluster for the third life event;

after assigning the first transaction to the second cluster for the third life event, receive a request from the user for transactions related to the travel life event;

in response to the request, reduce an amount of network bandwidth consumed to retrieve data from the database by clustering the plurality of transactions according to identifiers for the clusters in the database and retrieving from the database the second transaction assigned to the first cluster but not the first transaction assigned to the second cluster, thereby reducing the amount of data retrieved from the database;

determine transactions assigned to the first cluster;

determine, for each of the transactions assigned to the first cluster, a corresponding transaction price;

determine, based on the transaction price determined for each of the transactions assigned to the first cluster, a total price for transactions assigned to the first cluster;

determine, based on the total price, a predicted price range for a subsequent travel life event, wherein the predicted price range encompasses the total price; and communicate, to a user device, a report comprising the retrieved second transaction correlated with the travel life event and the predicted price for the subsequent travel life event according to the identifier of the particular cluster stored in the database, thereby reducing an amount of data retrieved and presented to the user device and consequently increasing processor speeds of the data aggregator and the user device and decreasing consumption of processor resources, memory resources, and network bandwidth by the data aggregator and the user device.

12. The system of claim 11, wherein the database stores authentication information for the user.

13. The system of claim 11, wherein the data aggregator is further configured to:

determine a first transaction type for the first transaction; and determine a second transaction type for the second transaction.

14. The system of claim 11, wherein the data aggregator is further configured to determine the third life event based on a social media feed.

15. The system of claim 11, wherein the data aggregator is further configured to:

retrieve a total price for each cluster of a plurality of clusters, each cluster of the plurality of clusters for a different life event; and communicate each life event for the plurality of clusters and the total price for each cluster of each life event.

* * * * *